United States Patent [19]

Pons

[11] Patent Number: 4,911,801

[45] Date of Patent: Mar. 27, 1990

[54] ELECTRICALLY CONDUCTIVE POLYPARAPHENYLENE POLYMERS, AND METHODS FOR THEIR PREPARATION AND USE

[75] Inventor: B. Stanley Pons, Salt Lake City, Utah

[73] Assignee: University of Utah, Salt Lake City, Utah

[21] Appl. No.: 782,968

[22] Filed: Oct. 1, 1985

[51] Int. Cl.[4] .......................... C25C 11/00; H01B 1/06
[52] U.S. Cl. .................................. 204/59 R; 528/396; 528/397; 252/500; 252/518
[58] Field of Search ............. 252/518, 500; 204/59 R; 528/396, 397

[56] References Cited

U.S. PATENT DOCUMENTS

| | | | |
|---|---|---|---|
| 3,830,746 | 8/1974 | Brown | 252/301.1 R |
| 3,974,121 | 8/1976 | Wang | 260/37 R |
| 4,375,427 | 3/1983 | Miller et al. | 252/512 |
| 4,411,741 | 10/1983 | Janata | 204/1 T |
| 4,440,669 | 4/1984 | Ivory et al. | 252/518 |
| 4,472,487 | 9/1984 | Maxfield et al. | 429/194 |
| 4,472,489 | 9/1984 | Maxfield et al. | 429/213 |
| 4,486,292 | 12/1984 | Blackburn | 204/416 |
| 4,502,938 | 3/1985 | Covington et al. | 204/412 |

OTHER PUBLICATIONS

Pons et al., "Electrochemical Formation and Properties of Polyphenylene from Biphenyl".
Feldman et al., "The Potential Dependence of Electrical Conductivity and Chemical Charge Storage of Poly(pyrrole) Films on Electrodes", 107 J. Am. Chem. Soc., 872–878 (1985).
Asavapiriyanont et al., "The Electrodeposition of Poly-pyrrole Films from Aqueous Solutions", 177 J. Electroanal. Chem., 229–244 (1984).
Asavapiriyanont et al., "The Electrodeposition of Poly-N-Methylpyrrole Films from Aqueous Solutions", 177 J. Electroanal. Chem., 245–251 (1984).
Street et al., "Conducting Polymers: A Review of Recent Work", 25 IBM J. Res. Develop., 51 (Jan. 1981).
LaViron, "A Multilayer Model for the Study of Space Distributed Redox Modified Electrodes; Part I. Description and Discussion of the Model", 122 J. Electroanal. Chem., 1–9 (1980).
Baeriswyl et al., "Conducting Polymers: Polyacetylene", Chapter 7.

Primary Examiner—Josephine Barr
Attorney, Agent, or Firm—Workman, Nydegger & Jensen

[57] ABSTRACT

Electrically conductive polyparaphenylene polymer compositions are disclosed, as well as methods for their preparation and use, including use of the polymers in constructing a sensor. The polymer compositions have the characteristics of being both solution processible, as well as electrically conductive. The polymers are produced by placing a metal electrode into an aprotic solution of biphenyl. Current is then passed through the electrode such that the electrode becomes the anode and such that the biphenyl polymerizes and is deposited on the electrode. A sensor is produced by incorporating a sensor species into a polyparaphenylene polymer prepared according to the teaching of the present invention. This can be accomplished by polymerizing the biphenyl in the presence of the sensor species.

20 Claims, 7 Drawing Sheets

ELECTRICALLY CONDUCTIVE POLYPARAPHENYLENE POLYMERS, AND METHODS FOR THEIR PREPARATION AND USE

BACKGROUND

1. Field of the Invention

The present invention is related to electrically conductive polyparaphenylene polymers which are prepared electrochemically and which are adaptable for use in chemical sensors and other similar devices.

2. The Background of the Invention

A. Electrically Conducting Polymers

There has been a continuous interest over an extended period of time in the production of synthetic polymers which are electrically conductive. It has long been recognized that if such electrically conducting polymers could be produced (and also retain acceptable polymeric properties such as solution processibility and suitable mechanical properties), the potential uses would be extensive.

For example, it has been suggested that conductive polymers could be a desirable alternative, in a wide variety of situations, to traditional conductive metals such as copper. The replacement of copper wire with a synthetic polymer would have many potential benefits, including a marked decrease in cost. Authors have speculated that possible applications for electrically conductive polymers may include use in batteries, antistatic coatings, solar cells, and in connection with other specific chemical substances in sensors of specific chemicals in liquids or gases.

Electrically conductive polymers would generally have a variety of desirable characteristics when used as a conducting material. Polymers are generally low in density and high in placticity as compared to known conductive materials, such as metals. At the same time, some investigators have speculated that it may be possible to produce a conductive polymer which is melt and solution processible. That is to say, the polymer is capable of being extruded or molded to predetermined shapes, or painted onto various surfaces.

It is clear that if such a material could be produced, it would have a wide variety of important applications in the field of electronics, particularly where it is necessary to produce a conductive substance having a complex shape.

Other potential advantages of conductive polymers can easily be identified. Polymers are generally low in toxicity, whereas conventional conductive materials are often highly toxic. The energy requirements needed to produce polymers are also extremely low when compared to the production of conducting metals such as copper and aluminum. The process of polymer production is relatively nonpolluting, and the polymers produced may well be easier to handle than other conducting substances.

As will be discussed further below, while conventional polymers have the desirable characteristics enumerated above, the few polymers which have been modified to become electrically conductive have become hard to handle, brittle, and insoluble. Thus, their usefulness for the purposes discussed above is presently extremely limited.

It will be appreciated that polymers are generally considered to be insulating rather than conducting. The insulating characteristics of polymers have been attributed to the relatively wide spacing between polymer molecules. As a result, production of a conducting polymer involves a major change in the electrical and chemical characteristics of conventional polymers.

Certain polymers, however, are known to be at least somewhat conductive. For example, $(SN)_x$ polymers are known to conduct. Even these polymers, however, are significantly less conductive than are conductive metals such as copper. In addition, they lack the desirable properties of easy preparation, solubility, and safety in handling.

Traditional carbon-backbone polymers, as mentioned above, are generally insulating. However, when these polymers are pyrrolyzed or graphitized (i.e., dehydrogenated at high temperatures), electrically conducting graphite polymers have been produced. This conductivity has been attributed to the closely spaced graphite structure formed by these procedures.

Unfortunately, such graphite polymers have been found to be difficult to prepare in a controlled manner and thus show a wide variation of electrical characteristics. Furthermore, these polymers are not easily processed and handled and have few of the other desirable characteristics identified above.

In order to produce a desirable and usable polymer which is also electrically conductive, the practice has developed of adding various additional substances, referred to generally as dopants, to the polymer. These dopants may convert an otherwise insulating polymer to a relatively conductive material without totally changing the other characteristics of the polymer.

A variety of techniques have been developed to add dopants to a polymer. Some widely used techniques include exposing the polymer to a vapor of the dopant or placing the dopant into a solution of the polymer. Each of these techniques has been found capable of incorporating dopants into conventional polymers.

Dopants used in such processes, as would be expected, generally comprise molecules which are either electron acceptors or electron donors. Polymers may be doped to an "n-type" state by incorporating electron donor dopants into the polymers. The most generally used dopants are usually Lewis bases, such as alkalai metals. Likewise, polymers may be doped to a "p-type" state by incorporating electron acceptor dopants into the polymer. The dopants generally used to dope to a p-type state include Lewis acids, such as iodine, bromine and arsenic pentafluoride.

Despite some success in doping polymers, serious problems have been encountered in the preparation and use of doped polymers. For example, doped polymers are not generally stable in air, nor are they stable at temperatures significantly in excess of room temperature. In addition, the dopants used are generally very toxic, which presents significant problems in handling and preparation.

The dopants also generally cause the mechanical characteristics of the polymer to degrade. For example, doped polymers are often brittle and totally insoluble. As a result, the polymer is difficult to handle in both the liquid and solid states. The advantages and uses of such a polymer are, therefore, limited. This defeats the very purpose of having a conductive polymer—that is, to produce a material having desirable metallic conductivity characteristics, while maintaining desirable polymeric mechanical and chemical properties, such as solution processibility. In addition, until the production of the present invention, it has not been possible to electrochemically grow a doped polymer, so that film size and other characteristics are difficult to control.

One polymer which has shown promise in the doped form is polyphenylene. However, it has been recognized that attempts to produce non-doped conductive polyparaphenylenes have been unsuccessful. See U.S. Pat. No. 4,440,669 to Ivory et al., which is entitled "Electrically Conducting Compositions of Doped Polyphenylenes and Shaped Articles Comprising the Same." Specifically, the Ivory patent recognizes that "Researchers have tried for over twenty years to obtain highly conducting complexes of carbon backbone polymers." Ivory, column 1, lines 49–51. Ivory continues stating that "Previous efforts to obtain poly(p-phenylene) complexes having conductivities as high as $10^{-3}$ $ohm^{-1} cm^{-1}$ have been unsuccessful." Ivory, column 2, lines 42–44. As a result, it will be appreciated that the production of a conducting carbon backbone polymer without resort to doping has been an elusive goal. In particular, previous attempts to produce conductive polyparaphenylene have failed.

Despite the inability of researchers to produce non-doped conductive polymers, the potential utility of such a product has lead to the production of conductive-doped species in various attempts to produce such a polymer. Examples of doped polyphenylene forms which have been made are: polyparaphenylene sulfide, polymetaphenylene sulfide, monomethyl and dimethyl substituted polyparaphenylene sulfides, polyparaphenylene oxide, polyparaphenoxyphenyl sulfide, and polyparaphenylene disulfide. See U.S. Pat. No. 4,375,427 to Miller et al., which is entitled "Thermoplastic Conductive Polymers." While doped polyphenylenes such as these have been produced having increased conductivities, those polymers have many of the drawbacks mentioned above. These polymers are found to be relatively insoluble, infusible, brittle, and cannot generally be shaped without sintering. Thus, their utility for many applications is extremely limited.

In addition, electrochemical oxidative polymerization of benzene to form polyparaphenylene requires the use of solvents such as hydrogenfluoride (HF) or sulfur dioxide ($SO_2$). These solvents are unattractive because of safety problems (e.g., corrosiveness and toxicity) and the difficulty in handling these solvents.

Thus, as discussed in the Ivory patent, polyparaphenylene has not been considered capable of convenient electrochemical production, nor has it been considered conducting in its nondoped state as discussed in both the Ivory and Miller patents.

Even in view of the discussion above, certain investigators continue to believe that undoped, conductive polymers may be produced. Specifically, interest has centered around conductive polypyrrole polymers. While conductive polypyrrole has been identified, it possesses many of the undesirable physical and chemical characteristics discussed with respect to doped polymers—the polymer is not solution processible, and it is not stable in air. In addition, the polymer is expensive to produce because of the high cost of the pyrrole monomer.

In view of the foregoing discussion, it would be a very significant advancement in the art to produce polymers which were conducting without altering the polymeric structure and without adding dopants. It would be a further advancement in the art if such polymers could be produced which were soluble in conventional solvents and, thus, solution processible, and which also retained favorable mechanical properties such as plasticity. It would also be an advancement in the art if such polymers could be produced from inexpensive and readily available precursor molecules. Such polymers and the methods of manufacture of those polymers are disclosed and claimed below.

B. Chemically Selective Sensors

One area of particular interest is the area of chemical sensors. Chemical sensors are widely used in a broad spectrum of applications. For example, it may be critical in the chemical and petroleum processing field to sense various species and materials in a particular environment. Small quantities of impurities may destroy the effectiveness of a process. Likewise, the addition of small quantities of a particular substance may be required to assure the effectiveness of a process.

Other applications of sensors are numerous. Sensors may be used to detect air and water pollutants. Certain types of sensors may be employed to detect emergency situations such as fires or leaks of toxic materials. Other uses of sensors include biological system monitoring, process line quality control, military use, and chemical analysis.

It is clear that efficient sensors which are capable of sensing small quantities of specific substances are critically needed. However, it has been difficult to produce sensors capable of sensing small quantities of materials in a solution environment. In particular, it has been difficult to produce electrochemically operated sensors for detecting small quantities of materials. This is the case because it has been difficult to generate a sufficient change in current caused by the presence of a small quantity of a substance and because of the lack of specificity in electrochemical experiments.

As a result, it would be a significant advancement in the art to produce a sensor capable of effectively sensing extremely small quantities of a particular material in a gaseous or liquid environment. In particular, it would be an advancement in the art to provide such a sensor which was electrically activated. It would be a further advancement in the art to incorporate a sensing species into a conductive polymer to form such a sensor, such that sensing molecules in the sensor could be caused to sense specific species in a liquid or gaseous environment by passing a current through the conductive polymer.

BRIEF SUMMARY AND OBJECTS OF THE INVENTION

The present invention relates to unique electrically conductive polyparaphenylene polymers and to the process for electrochemically synthesizing such polymers. In addition, the present invention is directed to the use of these polyparaphenylene polymers, synthesized according to the teachings of the present invention, in sensors capable of sensing specific chemical species in liquid and/or gaseous environments.

More particularly, the present invention is directed to the electrochemical production of polyparaphenylene from biphenyl. Historically, it has been difficult to produce polyparaphenylene electrochemically. One major problem has been the fact that the electrochemical oxidative polymerization of benzene to form polyparaphenylene required the use of solvents such as HF or $SO_2$. As mentioned above, these solvents are unattractive because of safety and handling problems. In addition, it has been found that benzene, the most commonly used precursor in polyphenylene synthesis, is so reactive that the polymerization reaction was not easily controlled and the resulting polymeric product is not predictable.

According to the teachings of the present invention, a solution of biphenyl dissolved in an aprotic solvent (such as acetonitrile) is used in the electrochemical process. Into this solution is placed an electrode, such as a platinum or vitreous carbon électrode. A potential is introduced across the electrode so that the electrode becomes the anode. It will be appreciated that the cathode may be any conventional cathode commonly used in electrochemistry. Indeed, the cathode may be placed in a compartment separated from the compartment containing the anode.

Utilizing this procedure, a layer of polyparaphenylene polymer begins to form on the surface of the anode. As the procedure is continued, additional polymer is deposited on the anode surface so as to produce a thicker polyparaphenylene layer.

It has been found that once the polymer is formed in this manner, the polyparaphenylene polymer is itself conductive, without the necessity of adding dopants. Moreover, it has been found that the polyphenylene polymer produced according to this method possesses favorable mechanical and chemical properties. For example, the polymer is readily dissolved in the relatively safe N-methylpyrrollidone and is, therefore, solution processible. In addition, such electrochemically produced polyparaphenylene polymers have the favorable plastic mechanical properties common to typical carbon-backbone polymers.

Because of their conductivity, the polymers of the present invention have been found to be particularly useful in many applications. One such application is for use in a sensor. To produce a chemically selective sensor, sensing molecules are incorporated into a polymer produced according to the teachings of the present invention. This may be achieved by simply introducing the desired sensing molecules into the biphenyl solution as the polymer is being electrochemically formed.

Once a polymer is produced having incorporated sensing molecules, the sensing molecules may be activated by passing a predetermined current through the polymer. With this standard current defined, specific changes in the current can be monitored to indicate the presence, and even the amount, of the species which the sensing molecules are designed to detect.

It is, therefore, a primary object of the present invention to provide methods for electrochemically producing an electrically conductive polymer.

It is a related object of the invention to produce an electrically conductive polymer which does not require doping in order to have conductivity.

It is also an object of the present invention to provide electrically conductive polyparaphenylene polymers which are soluble, solution processible and retain the favorable mechanical properties of typical carbon-backbone polymers.

It is a further object of the present invention to produce electrically conductive polyparaphenylene polymers from inexpensive and easily handled precursors.

It is a still further object of the invention to provide a sensor which incorporates a polymer having the properties described above.

In particular, it is an object of the present invention to provide an electrically activated sensor which is capable of sensing small quantities of a specific species in a gaseous or liquid environment.

These and other objects and advantages of the invention will become apparent from the following detailed description of the preferred embodiments of the present invention and from the appended claims and upon reference to the attached drawings.

DETAILED DESCRIPTION OF THE PREFERRED EMBODIMENTS

Figure 1:
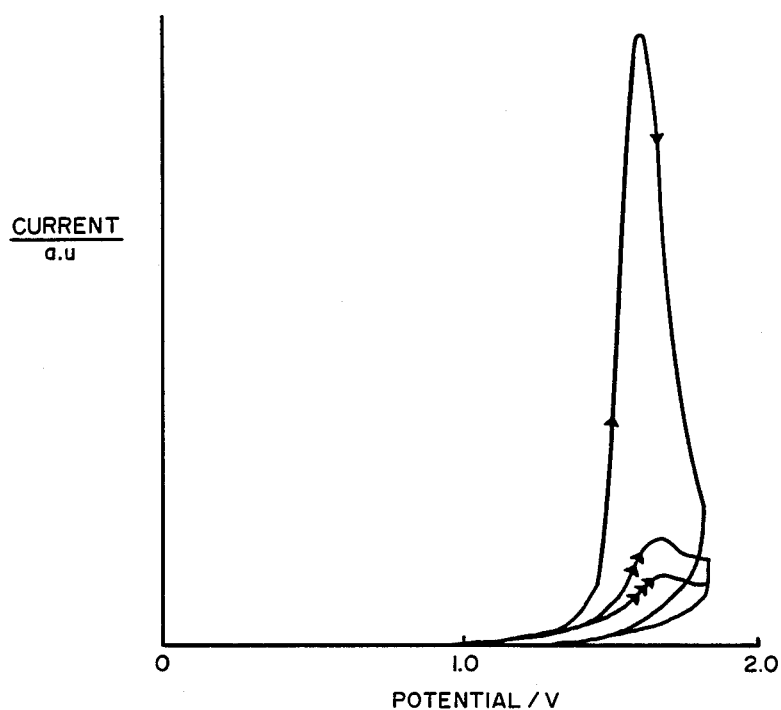
FIG. 1 is a cyclic voltammogram recorded at a platinum electrode in a 1.0M biphenyl solution in acetonitrile.

The present invention is directed to carbon-backbone polymers which are both electrically conductive and solution processible. In particular, the present invention relates to polyparaphenylene (sometimes hereinafter referred to as "PPP") polymers which are prepared electrochemically. The resulting polymers are easily handled, dissolved, and used in a variety of applications, as more fully discussed below.

While most prior art processes have attempted to produce PPP electrochemically from benzene, the PPP polymers of the present invention are produced using a solution of biphenyl. The electrochemical oxidative polymerization of benzene requires the use of unattractive solvents such as HF or $SO_2$. Thus, with few exceptions, no serious attempts have been made to electrochemically grow PPP.

A. ELECTROCHEMICAL METHOD OF FORMING PPP POLYMERS

In a presently preferred embodiment of the invention, biphenyl is dissolved in an acceptable solvent. It is preferable that the solvent be aprotic, that is, the solvent, should have a moderately high dielectric constant, but not contain acidic hydrogen. This is in contrast to protic solvents such as water and alcohols.

One aprotic solvent which has been found to be suitable for use in the present invention is acetonitrile. In the event that it is desired to characterize the synthesized polymer, it is desirable to use spectroscopic grade acetonitrile stored over alumina in order to assure the formation of a pure polymer product. Other suitable solvents and solvent mixtures may include chlorinated lower molecular weight alkanes and nitromethane.

The biphenyl solution requires a supporting electrolyte. A large number of electrolytes and electrolyte mixtures have been successfully employed in the synthesis of the PPP polymers. Some examples of electrolytes which have been found to be acceptable include: lithium perchlorate in acetonitrile, lithium hexafluoroarsenate in acetonitrile, tetra-n-butylammonium tetrafluoroborate ("TBAF") in dichloromethane, TBAF in methylene chloride, and mixtures of those electrolytes in 1,2-dichloromethane.

Once a suitable solution of biphenyl is obtained, an anode is placed in the solution. An acceptable anode is a platinum electrode, although other types of metal and carbon electrodes are suitable to varying degrees. Any type of conventional cathode may be used and may indeed be placed in a compartment which is separated from the compartment containing the anode. A current is then introduced across the anode as it rests in the biphenyl solution. A current in the range of from about $1nA/cm^2$ to about $1A/cm^2$ has been found to be acceptable.

It has been found that, by following this electrochemical reaction procedure, a film of polymer begins to form on the surface of the anode. Initially, the polymer film appears gold in color and is extremely adherent to the electrode. As the process continues and the thickness of the polymer film increases, the film becomes less adherent and finally turns black in color. Slow scan voltammetry, as opposed to sweeps or potential step methods, tends to result in a more highly ordered and conductive structure. Slow scan voltammetry also tends to produce a thicker polymer film.

It should also be noted that temperature directly affects the formation of the polymer film. Higher temperatures (e.g., 150°–250° C.) tend to result in lower molecular weight structures which are also more entropic and less adherent. While temperatures ranging from about −40° C. to about 250° C. may be used, it has been found that highly conductive para-substituted polymer structures, having good general characteristics, are produced at approximately room temperature (15°–30° C.).

One use of the PPP polymer of the present invention is in forming a sensor. The operation of such a sensor will be discussed more fully below. However, in order to form a sensor, it is necessary to incorporate into the polymer a sensing species.

One effective method for incorporating such a species is simply to generate the polymer in a solution containing the sensing molecules. While this approach has been found acceptable for a variety of species, it will be appreciated that other conventional procedures may be used in order to incorporate the sensing species into the polymer. It has been found that even relatively large molecules, such as mammalian hemoglobin, can be incorporated within the PPP polymer of the present invention.

One clear advantage of the electrochemical production of PPP and PPP having incorporated sensing molecules is the control over the process which is maintained. The rate of the electrochemical polymerization process can be controlled by controlling current flow characteristics. As mentioned above, the characteristics of the film produced from any one of a variety of electrochemical techniques is known and controllable. Likewise, film thicknesses can be closely monitored and controlled. This is in direct contrast to prior art methods of synthesizing PPP from benzene. Those processes resulted in little control over film thickness, and may well result in the formation of polyphenylene species other than PPP.

B. THE CHARACTERISTICS OF ELECTOCHEMICALLY PRODUCED PPP POLYMERS

Electrochemically formed PPP has been found to have several unique characteristics. As mentioned above, one of the primary unique characteristics is that of conductivity. Electrochemically formed PPP displays both metallic and nonmetallic characteristics; the metallic characteristics of the PPP polymer can be readily exhibited by the introduction of a current flow through the PPP.

A further unique characteristic is that of solution processibility. The electrochemically formed PPP is easily dissolved in conventional solvents such as N-methylpyrrolidone. As a result, the polymer can be easily handled and can be used to coat surfaces, or it can be cast or molded into almost any desired configuration.

This is in direct contrast to prior art PPP and prior art conductive polymers. Those polymers were typically found to be extremely insoluble and were also often found to be brittle solids. As a result, it was difficult, if not impossible, to coat surfaces with these polymers or to cast and mold these polymers into desired shapes.

Thus, the ability of the electrochemically formed PPP polymers within the scope of the present invention to be formed into complex shapes gives rise to many possible applications in the field of electronics and other areas. Likewise, the lack of acceptable solubility and mechanical properties in prior art polymers accounts for some of the historical lack of interest in conductive polymers.

As an additional point, PPP polymers made according to the present invention are stable. The polymer does not easily degrade in air and is relatively stable at elevated temperatures. These characteristics are also extremely important in expanding the scope of use of the polymer and are in contrast to prior doped polymers as well as prior conductive polymers.

A typical PPP film was formed according to the synthesis procedure discussed above and characterized using a series of characterization methods. The results of the formation and characterization are illustrated graphically in the attached drawings.

FIG. 1 shows a cyclic voltammogram recorded at a platinum electrode on continued cycling in a 1.0 mM solution of biphenyl. The results clearly indicate that an insulating surface film is formed because of the rapid fall in the current at high potentials.

Figure 2:
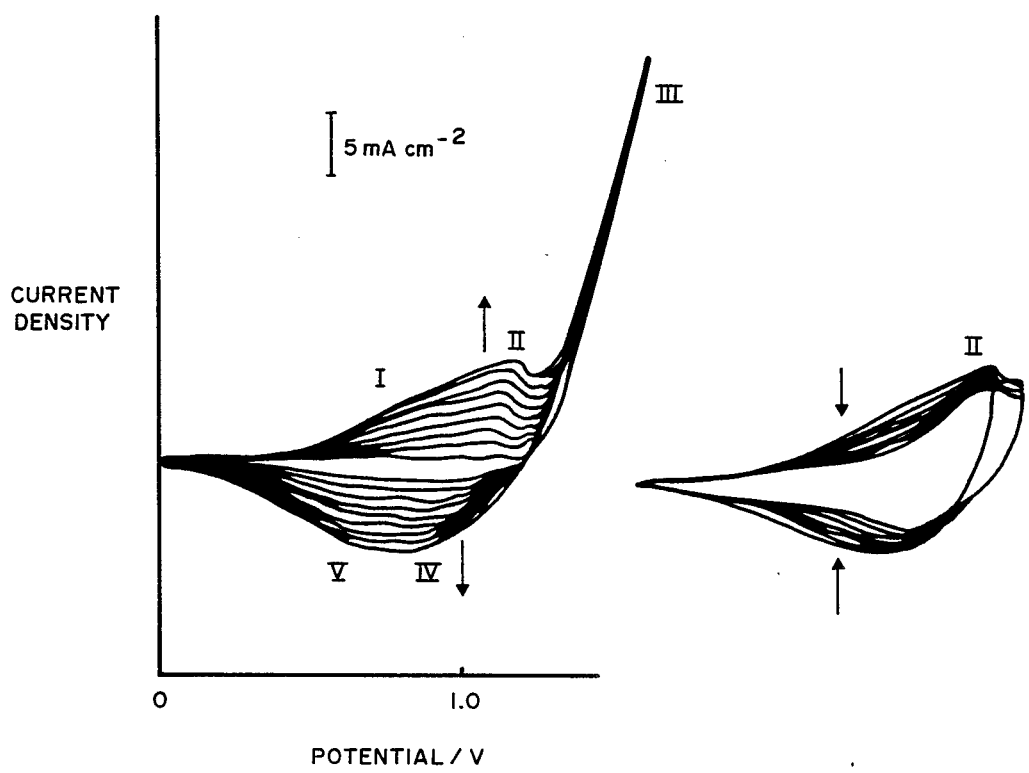
FIG. 2 is a cyclic voltammogram recorded at the platinum electrode in a 1.0M biphenyl solution in acetonitrile/tetra-n-butylammonium tetrafluoroborate ("TBAF").

In a 1.0M biphenyl solution, as illustrated in FIG. 2, however, the current was ohmically controlled at high potentials and accompanied by the growth of two redox couples centered at about 0.7 and 1.0 V with respect to Ag/Ag+ on continued cycling. When the positive scan limit was reduced, wave I was lost, but wave III remained and was not effected by stirring the solution. The loss of wave I indicates that this is a solution soluble species generated during the oxidation of biphenyl. On removal from the solution the electrode was seen to be covered with an adherent black PPP film.

Figure 3A:
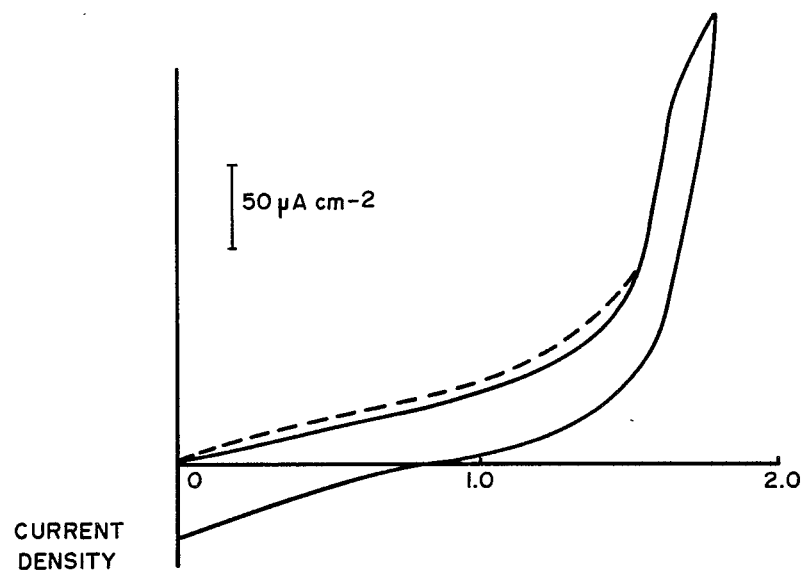
FIG. 3a is a cyclic voltammogram of a "thin" polyphenylene film in a solution of TBAF.
Figure 3B:
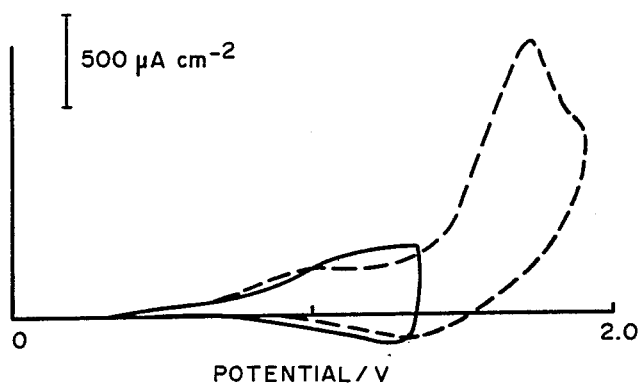
FIG. 3b is a cyclic voltammogram of a "thick" polyphenylene film in a solution of TBAF.

The voltammetry of the film formed as described above, in a solution containing only supporting electrolyte was strongly dependent on the film growth conditions. Growth from dilute solutions tended to yield strongly adherent gold-colored films with voltammetry as shown in FIG. 3A. Growth from concentrated solutions yielded loosely adherent black deposits with voltammetry as depicted in FIG. 3B.

Figure 4:
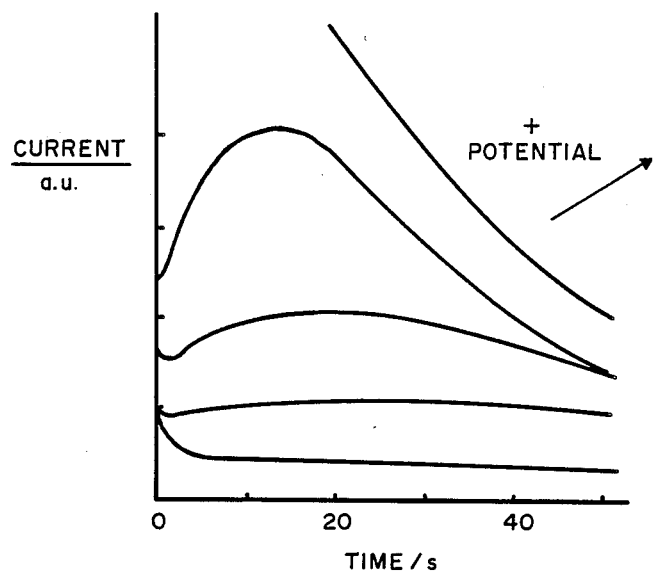
FIG. 4 is a graph showing potentiostatic growth of polyphenylene.

Under potentiostatic growth conditions, the current transient indicated a nucleation phenomenon as illustrated in FIG. 4. It would appear that the oxidation of biphenyl occurs preferentially on the polymer. Potentiostatically grown films displayed the same sort of voltammetry as potentiodynamically grown films, the exact behavior depending on the formation voltage and biphenyl concentration. A common feature to all the films, however, was the existence of an irreversible oxidation wave center at 1.7 V with respect to Ag/Ag+, and involving approximately 10% of the original "growth" charge.

Figure 5:
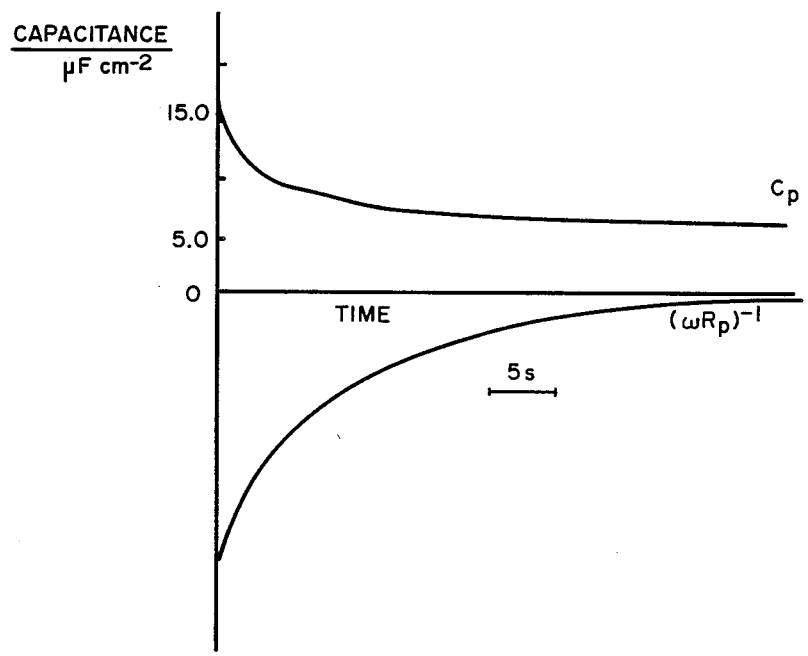
FIG. 5 is a graph showing in-phase and quadrature components of impedance of a polyparaphenylene film grown potentiostatically.

The conductivity of the polymer film was measured by conventional AC methods. Unlike results reported in the prior art, as the layer thickened under potentiostatic growth conditions, the film capacitance steadily fell as shown in FIG. 5.

Figure 6:
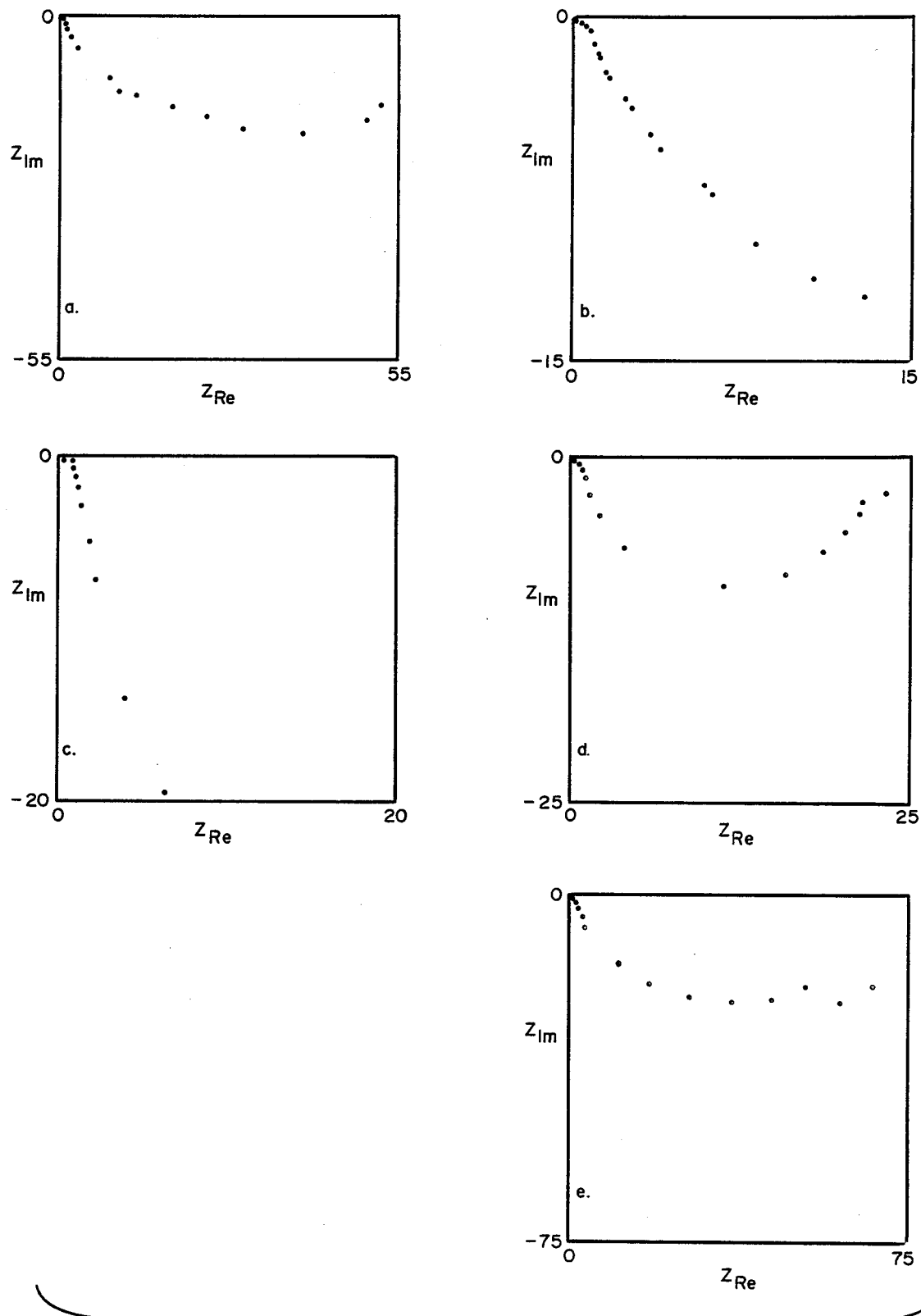
FIG. 6a is a complex impedance diagram for polyparaphenylene grown potentiostatically at 1.3 volts with respect to Ag/Ag+ at zero volts.
FIG. 6b is a complex impedance diagram for polyparaphenylene grown potentiostatically at +0.5 millivolts.
FIG. 6c is a complex impedance diagram for polyparaphenylene grown potentiostatically at +1.0 volt.
FIG. 6d is a complex impedance diagram for polyparaphenylene grown potentiostatically at +2.0 volts.
FIG. 6e is a complex impedance diagram for polyparaphenylene grown potentiostatically at 1.0 volt with respect to Ag/Ag+.

Complex plane impedance analysis, as illustrated in FIG. 6, indicated that when the electrode is held at increasingly positive potentials both components of the impedance are significantly reduced, and at potentials greater than 1.0 V, the impedance is purely capacitative. After "irreversible" oxidation at 2.0 V, however, the impedance increased to the value recorded at the 0 V level, and remained there even under an applied potential of 1.0 V.

Figure 7A:
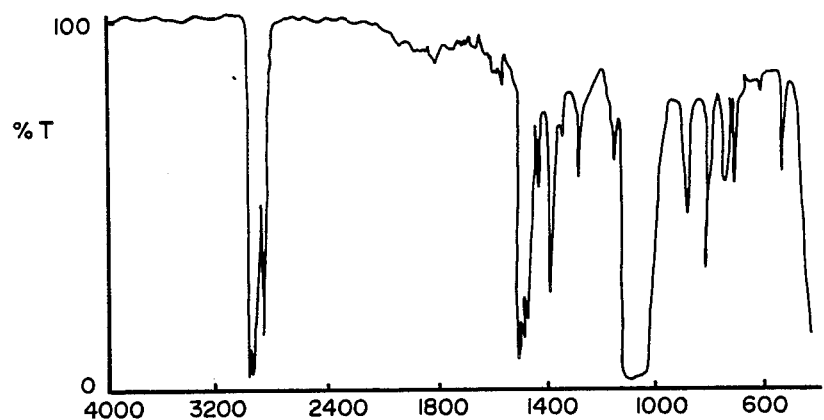
FIG. 7a is an infrared reflectance spectrum of a neutral polyparaphenylene film.
Figure 7B:
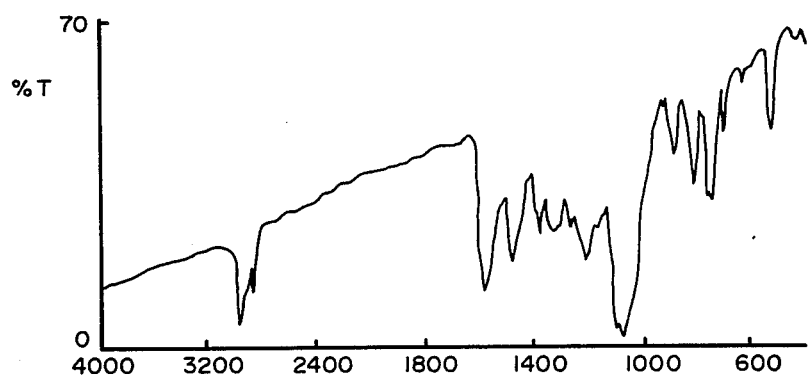
FIG. 7b is an infrared reflectance spectrum of an oxidized polyparaphenylene film.

Further evidence of film conductivity comes from infrared ("IR") reflectance spectroscopy. The IR reflectance spectrum for a neutral film is shown in FIG. 7A, while the IR reflectance spectrum for an oxidized PPP film is shown in FIG. 7B. The relative intensities of the 806 cm$^{-1}$ and 765 cm$^{-1}$ bands (unsubstituted and p-substituted phenyl C-H out-of-plane stretching bands, respectively) can be used to calculate the chain length. Also indicative of the chain length is the position of the C-H out of plane stretching band which varies from 837 cm$^{-1}$ for terphenyl, to 806 cm$^{-1}$ for PPP. When the film is oxidized most of the features are masked by the free carrier absorption, which again indicates a high film conductivity.

Figure 8:
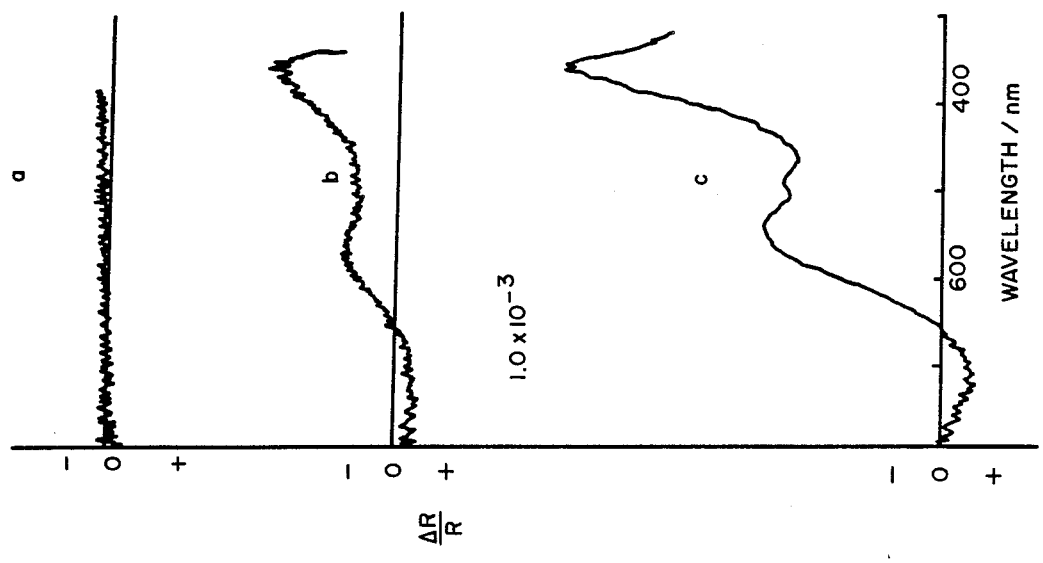
FIG. 8 is a modulated reflectance spectra of the same film as used in FIG. 6.

The polymer film was also characterized using modulated specular reflectance spectroscopy ("MSRS") resulting in spectra as shown in FIG. 8. There were two absorption maxima centered at 620 and 380 nm which increase in intensity as the bias potential is made more positive to a maximum at around +500 mV with respect to Ag/Ag+.

Figure 9:
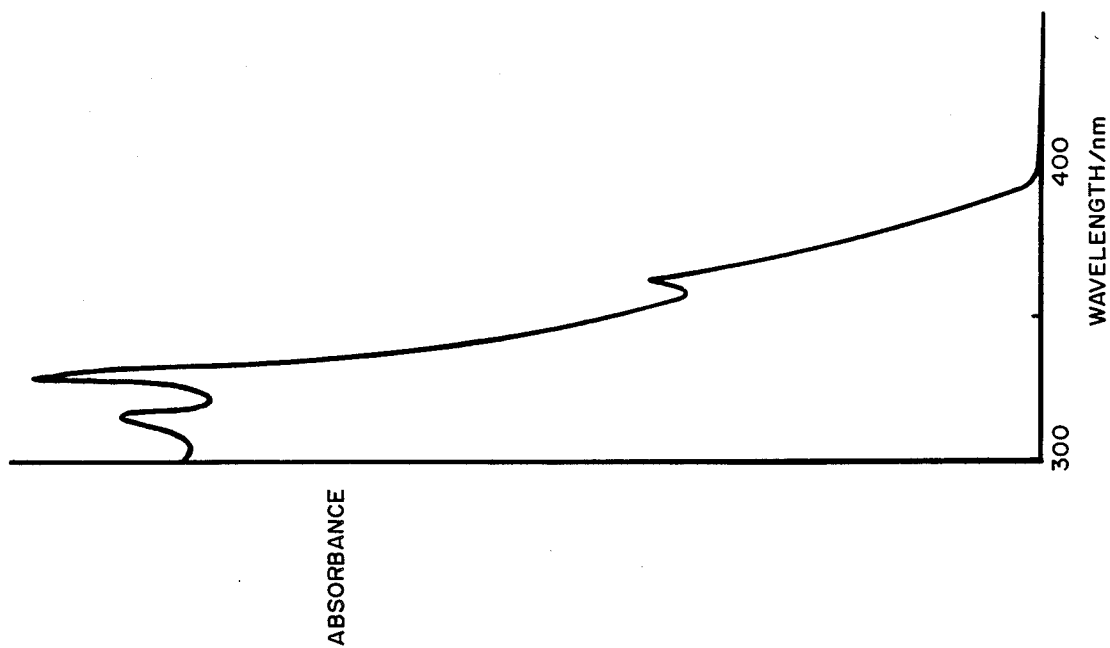
FIG. 9 is a UV/VIS absorption spectrum of a polyparaphenylene film dissolved in N-methyl pyrrolidone.

It was also found possible to measure the untraviolet ("UV") absorption spectra of the polymer directly since it was found that the electrochemically grown polymer, unlike the homogeneously oxidized material, is soluble in N-methyl pyrrolidone. The absorption spectrum, shown in FIG. 9, exhibits peaks at 315 nm, 330 nm and 360 nm. There is clearly a spectrum of oligomers with different chain lengths present. The 315 nm peak probably corresponds to hexaphenyl and the other maxima to correspondingly longer chains.

C. USE OF ELECTROCHEMICALLY FORMED PPP POLYMERS IN A SENSOR

Sensors made in accordance with the teachings of the present invention also provide a wide variety of advantages including the ability to provide electrically activated sensing means for use in air or in solution. Such a sensor essentially comprises the electrochemically synthesized PPP of the present invention having sensing molecules incorporated within the polymer matrix. Such sensing molecules can be incorporated within the PPP polymer matrix by simply generating the PPP polymer in the presence of the desired sensing species. Although other methods may also produce acceptable sensors, this method has been found to be satisfactory for a wide variety of species.

The sensor of the present invention results from the permeation of the polymer membrane by specific molecules, while at the same time other species are excluded from the polymer sensor. The specific molecules are detected by changes in the current passing through the sensor due to electron transfer near the sensor surface.

For example, manganese or iron substituted tetraphenylporphyrins may be incorporated within the PPP polymer. When oxygen comes in contact with such a polymer system, there is a rapid electron exchange between the oxygen and the trapped sensing species. The measurement of the resulting current results in a rapid and convenient method of detecting oxygen in the ambient environment.

Numerous other similar sensors may be constructed. For example, carbon monoxide may be sensed and quantified in the ambient environment adjacent to a sensor comprising a polymer film containing a small concentration of mammalian hemoglobin.

This type of sensor provides dramatically increased sensitivity over prior art methods. Such a sensor is effectively a concentration enhancer since the species used to detect can exist within the polymer at much greater concentrations than it can if added directly to the ambient solution. Thus, more active sites can be detected and measured. In particular, it has been found that sensitivities may be increased on the order of $10^8$ using the sensor of the present invention.

As mentioned above, sensors of this type can be formed to sense a variety of species in a variety of environments. For example, it is possible to determine the presence of carbon dioxide, carbon monoxide, and oxygen in the ambient environment. It will also be possible to sense species such as oxygen contained within vinyl chloride or other related species.

As discussed above, conductive polymers have a potential application in that they can be used to trap a chemically reactive species and the reactivity of that species can be controlled electrically. One method of trapping the active center in the polymer is to simply generate the polymer in the presence of the species to be trapped.

Figure 10:
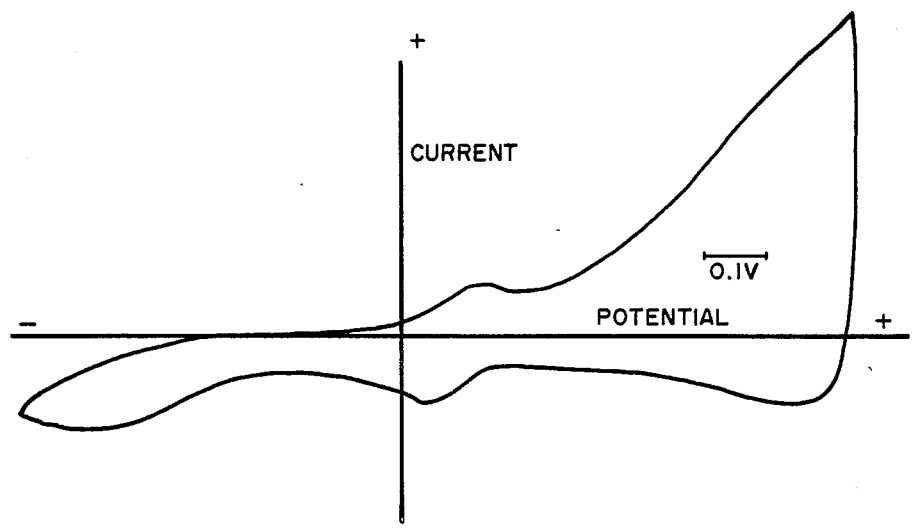
FIG. 10 is a cyclic voltammogram of a polyparaphenylene film grown by potential cycling in the presence of ferrocene, showing the ferrocene/ferrocenium couple.

FIG. 10 shows a cyclic voltammogram, obtained in a solution containing only base electrolyte of a PPP film electrodeposited in the presence of ferrocene. The ferrocene/ferrocenium couple is clearly observed, and persisted for several hundred scans without significant change. Interestingly, reduction wave VI, which is probably $H^+$ reduction, was consistently larger for films containing ferrocene, since the neutral film is apparently less conducting. This would appear to indicate charge transfer mediation by the ferrocene.

Similar results were obtained for 9,10-diphenylanthracene and anthracene showing that quite bulky molecules can be trapped by the same means. The most reliable method of incorporation appears to be potential cycling. It should be pointed out, however, that this is not a simple diffusion effect since a preformed film cycled in a solution of substrate has been found to lose its activity very quickly when transferred to a solution not containing the substrate.

Figure 11:
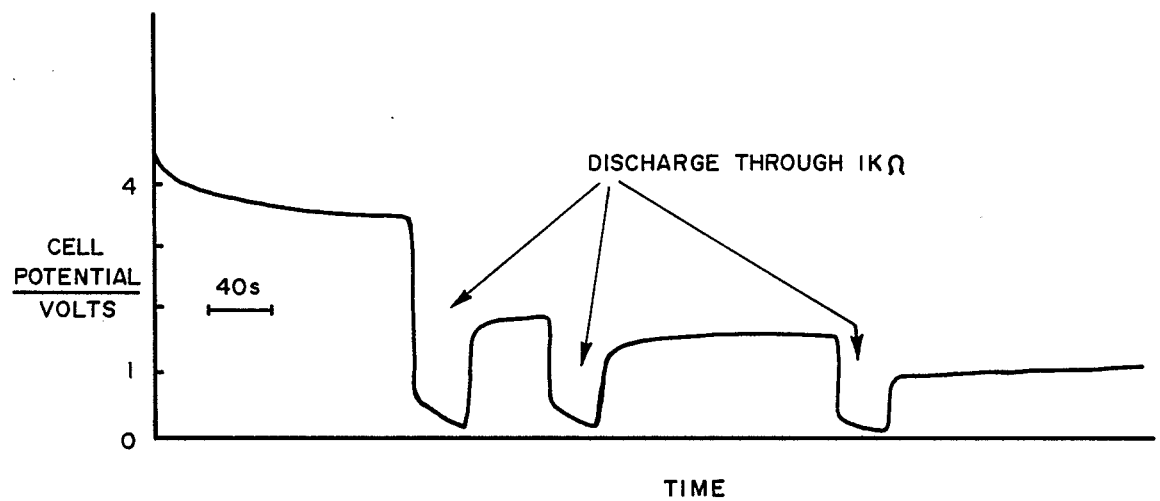
FIG. 11 shows the discharge characteristics of a simple polyparaphenylene battery made by polarizing two film electrodes in acetonitrile/LiAsF$_6$.

The ease with which films of PPP can be formed also suggests possible battery applications of the electroformed polymer film. Homogeneously polymerized phenylene has already been shown to have great promise in this area. A simple cell was made by polymerizing PPP on two platinum electrodes and applying a constant voltage between them, while immersed for a short time in a solution of $LiAsF_6$ in acetonitrile. It was considered that in this way one of the electrodes would intercalate $Li+$ and become "n-type" while the other would become "p-type" and intercalate $AsF_6-$. The cell voltage recorded under open circuit and on discharge is shown in FIG. 11. The initial value ws 3.8 V and this fell quickly to 2.2 after short circuit discharge.

D. EXEMPLARY FORMULATIONS

The following examples are given to illustrate the methods and compositions of the present invention and are not intended to limit the scope of the present invention.

EXAMPLE 1

This example describes the electrochemical preparation of a neutral species-sensitive polymer by cyclic voltammetry.

Reagent grade biphenyl (1.9 mg) was added to 25 ml of a 0.1M TBAF solution in acetonitrile. The TBAF was prepared as described in H. Lund and P. Iverson, *Organic Electrochemistry* (M. Baizer, ed., M. Dekker, New York, 1973), and the acetonitrile was purified as described by Pons et al.; 104 *J. Am. Chem. Soc.* 3045 (1982). The resulting solution was placed in a cell consisting of a three electrode system where the working electrode was platinum, the auxiliary electrode was platinum and the reference electrode was $Ag/Ag^+$ (0.01M) in the same solvent and background electrolyte.

After completely degassing the solution with helium, the potential of the working electrode was scanned in an anodic direction (100 mV/s) and an irreversible peak due to the oxidation of biphenyl was seen at +1.7 V. Polyparaphenylene polymer was deposited in an oxidized form on the platinum electrode carrying down the anion of the background electrolyte.

The resulting adherent, gold colored, polyparaphenylene polymer was washed with acetonitrile and dried under vacuum. The polymer, which was found to be stable at high temperatures and infusible. As distinct from the chemically made polymer, the polyparaphenylene polymer was found to be soluble in N-methyl pyrrolidone.

A polymer prepared according to the procedure described above, can be incorporated into a chemically sensitive field effect transistor configuration sensitive to carbonyl-, hydroxyl-, and nitrogen-containing compounds.

EXAMPLE 2

The following example describes the electrochemical preparation of a polyparaphenylene polymer by chronoamperometry.

The same solution and experimental set-up is used as that described in Example 1. In this example, the potential is stepped to a region where the biphenyl is oxidized, which is about +1.75 V with respect to $Ag/Ag^+$ (0.01M) reference in acetonitrile. By changing the concentration of biphenyl to 50 mM in 0.1M TBAF/acetonitrile and the region in the wave to which the potential is stepped to 1.85 V with respect to $Ag/Ag^+$ (0.01M), the properties of the resulting electrochemically formed polymer may be varied. Specifically, using the concentration and potential described above, a polyparaphenylene polymer is obtained having a chain length of approximately 10-12 units and a conductivity of 0.01 $ohm^{-1} cm^{-1}$. The resulting product is sensitive to polar molecules such as methanol and acetone.

EXAMPLE 3

The following describes the electrochemical preparation of polyparaphenylene polymer incorporating a dopant.

The experimental set-up for cyclic voltammetry is that described in Example 1, except the biphenyl solution is made up in an acetonitrile solution containing lithium hexafluoroarsenate as the background electrolyte. The anion is automatically incorporated into the polymer on electrochemical formation. Depending upon where the circuit is opened, the doping level can be controlled and greater conductivity can be obtained. Furthermore, the resulting polymer is found to have a large response for polar, neutral compounds.

EXAMPLE 4

The experimental set-up for cyclic voltammetry is that described in Example 1. However, the biphenyl solution is made up in an acetonitrile solution containing a different background electrolyte comprising: lithium hexafluoroantimonate. The anion is automatically incorporated into the polymer on electrochemical formation. The conductivity of the resulting polymer can be varied depending on where the open circuit is formed. Moreover, the polymer can be turned and it has a range of conductivity which is an order of magnitude less than that of the polymer of Example 3.

EXAMPLE 5

The experimental set-up for cyclic voltammetry is that described in Example 1. However, the biphenyl solution is made up in an acetonitrile solution containing a different background electrolytes comprising: lithium hexafluorophosphate. The anion is automatically incorporated into the polymer on electrochemical formation.

The resultant polymer is more adherent to the metal surface and has a minimum amount of pinholes exposing the metal surface.

EXAMPLE 6

The experimental set-up for cyclic voltammetry is that described in Example 1. However, the biphenyl solution is made up in an acetonitrile solution containing a different background electrolytes comprising: tetra(Alkyl) fluoborates. The anion is automatically incorporated into the polymer on electrochemical formation and producing a polymer which has the different physical properties from PPP. The resultant free-standing film is also more flexible than PPP.

EXAMPLE 7

This example is concerned with the exchange of anions from a polymer, already formed, with those present in a nonaqueous solvent. Since, as mentioned in Example 3, the specificity of response to certain neutral molecules depends on the dopant anion, the exchange of anions from the polymer with those in solution is described. A solution of the particular background electrolyte is prepared and the polymer is electrochemically connected to the working electrode. The potential is scanned from the rest potential anodically to about 200 mV cathodic of the solvent decomposition and cycled until the cyclic voltammogram no longer changes between scans.

EXAMPLE 8

This example describes the electrochemical preparation of a polyparaphenylene polymer with appropriate adducts to achieve greater specificity.

The oxidation of biphenyl as described in Example 1, is carried out in the presence of a species known to exhibit property changes in the presence of weak electron donating or accepting gases. Specifically, a 5 mM solution of biphenyl is oxidized in the presence of 10 mM of manganese phthalocyanine. The manganese is found to be chemically bound in the polyparaphenylene polymer when electrochemically prepared in the presence of manganese III. This procedure results in a film usable as a sensor for $NO_2$.

EXAMPLE 9

The oxidation of biphenyl as described in Example 1 is carried out in the presence of a species known to exhibit property changes in the presence of weak electron donating or accepting gases. Specifically, a 5 mM solution of biphenyl is oxidized in the presence of 10 mM of cobalt phthalocyanine. The cobalt is found to be chemically bound in the polyparaphenylene polymer when electrochemically prepared in the presence of cobalt II. This procedure results in a film usable as a sensor for carbon monoxide.

EXAMPLE 10

The oxidation of biphenyl as described in Example 1 is carried out in the presence of a species known to exhibit property changes in the presence of weak electron donating or accepting gases. Specifically, a 5 mM solution of biphenyl is oxidized in the presence of 10 mM of copper phthalocynanine. The copper is found to be chemically bound in the polyparaphenylene polymer when electrochemically prepared in the presence of copper. This procedure resulting is a film usable as a sensor for carbon monoxide.

EXAMPLE 11

The oxidation of biphenyl as described in Example 1 is carried out in the presence of a species known to exhibit property changes in the presence of weak electron donating or accepting gases. Specifically, a 5 mM solution of biphenyl is oxidized in the presence of 10 mM of iron tetraphenylporphyrins. The Iron is found to be chemically bound in the polyparaphenylene polymer when electrochemically prepared in the presence of Iron II. This procedure resulting is a film usable as a sensor for chlorine.

EXAMPLE 12

The oxidation of biphenyl as described in Example 1 is carried out in the presence of a species known to exhibit property changes in the presence of weak electron donating or accepting gases. Specifically, a 5 mM solution of biphenyl is oxidized in the presence of 10 mM of silver pthalocyanines. The silver pthalocyanines are found to be chemically bound in the polyparaphenylene polymer when electrochemically prepared in the presence of silver pthalocyanines. This procedure resulting is a film usable as a sensor for specificity toward sulfur-containing compounds.

EXAMPLE 13

The oxidation of biphenyl as described in Example 1 is carried out in the presence of a species known to exhibit property changes in the presence of weak electron donating or accepting gases. Specifically, a 5 mM solution of biphenyl is oxidized in the presence of 10 mM of magnesium tetraphenylporphyrins. The magnesium tetraphenylporphyrins are found to be chemically bound in the polyparaphenylene polymer when electrochemically prepared in the presence of magnesium tetraphenylporphyrins. This procedure resulting is a film usable as a sensor for oxygen-containing compounds.

EXAMPLE 14

This example describes the electrochemical deposition of a polyparaphenylene polymer onto a microdisk or microring electrode for use as a gas sensor directly. The working electrode takes the form of concentric rings (1-5 microns thick and 5-50 microns in diameter) embedded in a solid ionic conductor, comprising glass or beta alumina. The polymer is deposited covering both rings and the solid ionic conductor. In this case interaction of the gases with the polymer is necessary for current to pass between the rings through the solid ionic conductor.

E. SUMMARY

In summary, polyparaphenylene polymers of the present invention are both electrically conductive and solution processible. The polymers are formed by simply placing an electrode in a solution of biphenyl. A current is then introduced across the electrode so that the electrode becomes the anode. Once this takes place a PPP film begins to form on the electrode (anode). This process can be closely monitored so that the film thickness and characteristics can be controlled. This PPP film has been characterized as described above and found to have the characteristics of conductivity and solution processibility.

Sensors can be easily created using the process described above. Specifically, sensing molecules may be incorporated into the polymer film by introducing such molecules into the biphenyl solution before the electrochemical production of the polymer. Examples of such molecules include mammalian hemoglobin for detecting carbon monoxide and manganese substituted tetraphenylporphyrins for detecting oxygen.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of producing an electrically conductive, solution processible polymer comprising the steps of:
    placing a nonreactive electrode into contact with an aprotic solution of biphenyl, said aprotic solution further comprising a supporting electrolyte; and
    passing a current through the electrode and the biphenyl solution such that the electrode becomes the anode and such that a polymer is electrochemically deposited on the electrode.

2. A method as defined in claim 1 wherein the solvent in which the biphenyl is dissolved and is selected from the group consisting of acetonitrile, chlorinated alkanes having from 1 to 6 carbon atoms, and nitromethane.

3. A method as defined in claim 1 wherein the electrode is a platinum electrode.

4. A method as defined in claim 1 wherein the polymer is formed at a temperature in the range of from about −40° C. to about 250° C.

5. A method as defined in claim 1 wherein the polymer is formed at a temperature in the range of from about 15° C. to about 30° C.

6. A method as defined in claim 1 wherein the supporting electrolyte is selected from the group consisting of lithium perchlorate, lithium hexafluoroarsenate, tetra-n-butylammonium tetrafluoroborate, or mixtures thereof.

7. A method as defined in claim 1 wherein the current is directed through the electrode and the solution using slow scan voltammetry.

8. A method as defined in claim 1 wherein the current which flows through the electrode and biphenyl is in the range of from about 1 nA/cm$^2$ to about 1 A/cm$^2$.

9. A method as defined in claim 1 wherein the aprotic solution of biphenyl contains a second species which becomes incorporated into the polymer.

10. A method as defined in claim 9 wherein the second species is selected from the group consisting of: manganese, cobalt, copper, nickel, iron, zinc, sodium, magnesium, or silver phthalocyanines.

11. A method as defined in claim 9 wherein the second species is selected from the group consisting of: iron, magnesium, or manganese tetraphenylprophyrins.

12. A method of producing electrically conductive, processible polyparaphenylene from biphenyl, comprising the steps of:
    (a) obtaining an aprotic solution of biphenyl;
    (b) adding an electrolyte to the solution;
    (c) placing an electrode into the solution;
    (d) passing a current in the range of from about 1 nA/cm$^2$ to about 1 A/cm$^2$ through the electrode and the solution such that the electrode becomes the anode and such that polyparaphenylene is deposited on the surface of the electrode, while maintaining the solution at from about 15° C. to about 30° C.

13. A method as defined in claim 9 wherein the solvent in which the biphenyl is dissolved is selected from the group consisting of acetonitrile, chlorinated alkanes containing from 1 to 6 carbon atoms, and nitromethane.

14. A method as defined in claim 9 wherein the electrolyte is selected from the group consisting of lithium perchlorate, lithium hexafluoroarsenate, tetra-n-butylammonium tetrafluoroborate, or mixtures thereof.

15. An electrically conductive, solution processible polymer comprising polyparaphenylene prepared by introducing a nonreactive electrode into an aprotic solution of biphenyl, said solution further comprising a supporting electrolyte, and passing current through the electrode such that the polymer is electrochemically deposited on the electrode.

16. A polymer as defined in claim 14 wherein the solvent in which the biphenyl is dissolved is selected from the group consisting of acetonitrile, chlorinated alkanes containing from 1 to 6 carbon atoms, and nitromethane.

17. A polymer as defined in claim 15 wherein the electrode is a platinum electrode.

18. A polymer as defined in claim 15 wherein the polymer is formed at a temperature from about 15° C. to about 30° C.

19. A polymer as defined in claim 14 wherein the supporting electrode is selected from the group consisting of lithium pechlorate, lithium hexafluoroarsenate, tetra-n-butylammonium tetrafluorborate, or mixtures of this group of compounds.

20. a polymer as defined in claim 15 wherein the current passes through the electrode and the solution comprises slow scan voltammetry.

* * * * *